US006895319B2

(12) United States Patent
Alexander et al.

(10) Patent No.: US 6,895,319 B2
(45) Date of Patent: May 17, 2005

(54) VALVE COMMAND SIGNAL PROCESSING SYSTEM

(75) Inventors: William Guy Alexander, Waterloo, IA (US); David James Boege, Cedar Falls, IA (US)

(73) Assignee: Deere & Company, Moline, IL (US)

( * ) Notice: Subject to any disclaimer, the term of this patent is extended or adjusted under 35 U.S.C. 154(b) by 65 days.

(21) Appl. No.: 10/383,923

(22) Filed: Mar. 7, 2003

(65) Prior Publication Data

US 2004/0176894 A1 Sep. 9, 2004

(51) Int. Cl.[7] .................................................. G06F 7/00
(52) U.S. Cl. ........................................................ 701/50
(58) Field of Search ........................................... 701/50

(56) References Cited

U.S. PATENT DOCUMENTS 4,923,362 A 5/1990 Fryk .......................... 414/700
5,477,770 A * 12/1995 Ono et al. .................... 91/459
6,105,679 A * 8/2000 Schubert et al. ............... 172/4

* cited by examiner

*Primary Examiner*—Y. Beaulieu

(57) ABSTRACT

A hydraulic function can be extended and retracted under the control of an electrohydraulic valve unit. An operator movable command lever is movable into extend, center and retract region. A sensor generates a lever position signal. An electronic lever command unit receives the lever position signal and generates a valve command signal. An electronic valve control unit is remote from and communicated with the lever command unit. The electronic valve control unit controls communication of hydraulic fluid to the hydraulic function in response to the valve command signal. A method of generating the valve command signal includes generating a command signal which is proportional to the lever position signal when the lever is moved relatively slowly, and generating a command signal which is based on a maximum excursion of the lever into the extend and retract regions when the lever is moved relatively rapidly. Command signals are transmitted to the valve control unit after a delay time period which is a fraction of a period of the lever movement oscillation.

22 Claims, 3 Drawing Sheets

VALVE COMMAND SIGNAL PROCESSING SYSTEM

BACKGROUND

The present invention relates to a system and method for processing command signals, such as command signals for an electro-hydraulic control valve which operates a hydraulic device.

It is known to provide work vehicles, such as agricultural tractors, with a loader having a bucket which is movable by a hydraulic bucket cylinder. It is known to control the bucket cylinder with a conventional electro-hydraulic (EH) selective control valve (SCV), which, in turn, is controlled by an electronic valve controller. Bucket position and movement commands are generated by a control lever which is manipulated by an operator. In some commercially available systems, the position of the lever is monitored by an electronic lever unit which is communicated with the electronic valve controller. For example, in John Deere 7030 tractors, the lever and the electronic lever unit are mounted on an armrest in the tractor cab, and the electronic lever unit is communicated with a remote valve controller via a relatively slow speed serial communications data link.

In such systems, the response of the EH valve response is dependent upon the sample rate of the control lever position, the serial transmission rate of the serial data link and update rate at which the valve controller updates the valve command signal which is communicated to the SCV.

Typically, with such a system the actual bucket position and movement will not accurately match the control lever position and movement because of the slow serial communications data link. In addition, delays in the system may result in SCV conditions which conflict with the control lever. In some situations, such as when it is desired to dislodge debris from a loader bucket, an operator may desire to produce a vigorous and rapid SCV response by rapidly moving the control lever. If the transmission rate of the lever position to the EH valve controller is too slow, the SCV will typically not respond as desired by the operator, and the bucket movement may not be abrupt enough to loosen the debris. During a worst case, the transmission of the lever position over the serial communications link may occur when the control lever is near its center position instead of at maximum displaced position. As a result the lever command signal may not match the actual lever position and desired movement of the bucket may not be achieved.

SUMMARY

Accordingly, an object of this invention is to provide a system for vigorously extending and retracting a hydraulic cylinder in a system which slowly transmits command signals which are generated in response to manual movement of a control lever.

Another object of the invention is to provide such a system wherein the magnitude of the command signals will be a function of the magnitude of the displacements of the lever from its center position.

A further object of the invention is to provide such a system wherein the timing of command signals is a function of a frequency at which the lever is moved.

These and other objects are achieved by the present invention, wherein a hydraulic function, such as a loader bucket cylinder, can be extended and retracted under the control of an electrohydraulic valve unit. An operator movable command lever is movable into extend, center and retract regions. A position sensor generates lever position signal. An electronic lever command unit receives the lever position signals and generates a valve command signal. An electronic valve control unit is remote from the lever command unit and receives the command signals via a signal transmission link. The electronic valve control unit controls communication of hydraulic fluid to the hydraulic function in response to the valve command signal. When the lever is moved relatively slowly, the lever command unit generates command signals which are proportional to the lever position signal. When the lever is moved relatively rapidly, the lever command unit generates command signals which are based on maximum excursions of the lever into the extend and retract regions. When the lever first moves from the center region into the extend or retract region, transmission of the command signal is delayed by a time delay which is related to the frequency at which the lever is oscillated back and forth between the extend and retract regions.

This system provides the operator with better and more consistent control over the electrohydraulic valve. The system overcomes slow-speed or bottleneck digital communications. The system detects when the operator intends to "rattle" the bucket, and generates valve command signals which carry out this intention, despite data link limitations. As a result, performance and repeatability is greatly enhanced. For example, by allowing the operator more control over a loader bucket, the operator can more precisely control the loads. Instead of a random shaking of debris, the load can be scattered over a larger area more precisely and consistently with the controlled abruptness.

DETAILED DESCRIPTION

Figure 1:
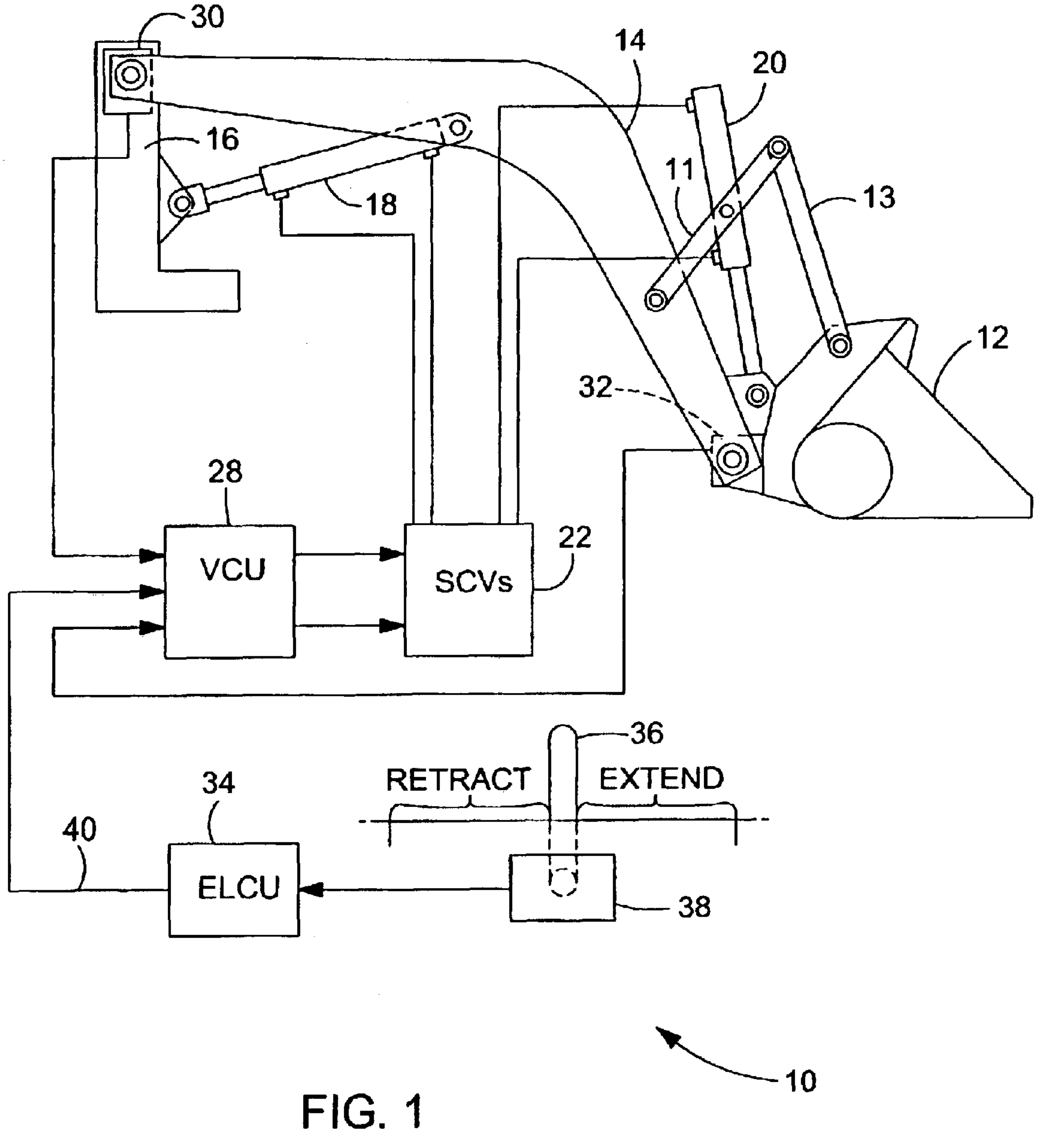
FIG. 1 is a simplified schematic diagram of a loader bucket control system according to the present invention.

Referring to FIG. 1, the bucket control system 10 includes a bucket 12 pivotally mounted on the end of a boom 14 which is pivoted on a frame member 16 of a vehicle or loader (not shown). The boom 14 is pivoted by a boom cylinder 18 and the bucket is pivoted by a bucket cylinder 20 connected to the boom and bucket by links 11 and 13. Electro-hydraulic SCVs 22 control fluid flow to and from the cylinders 18 and 20. An electronic valve control unit (VCU) 28 provides control signals to the SCVs 22 in response to signals from a boom position sensor 30, bucket position sensor 32 and a valve command signal from an electronic lever unit 34.

An operator generates bucket command signals by manipulating a control lever 36. Control lever 36 may be moved from a centered or neutral position into an "extend" range of positions and into a "retract" range of positions, corresponding to extension and retraction, respectively, of the bucket cylinder 20. Lever position sensor 38 provides a lever position signal to lever unit 34. Lever unit 34 provides a lever command signal to VCU 28 via a data link 40, such as a serial data communication bus. Conventional rotary potentiometers could serve as the sensors 30, 32 and 38.

Figure 2A:
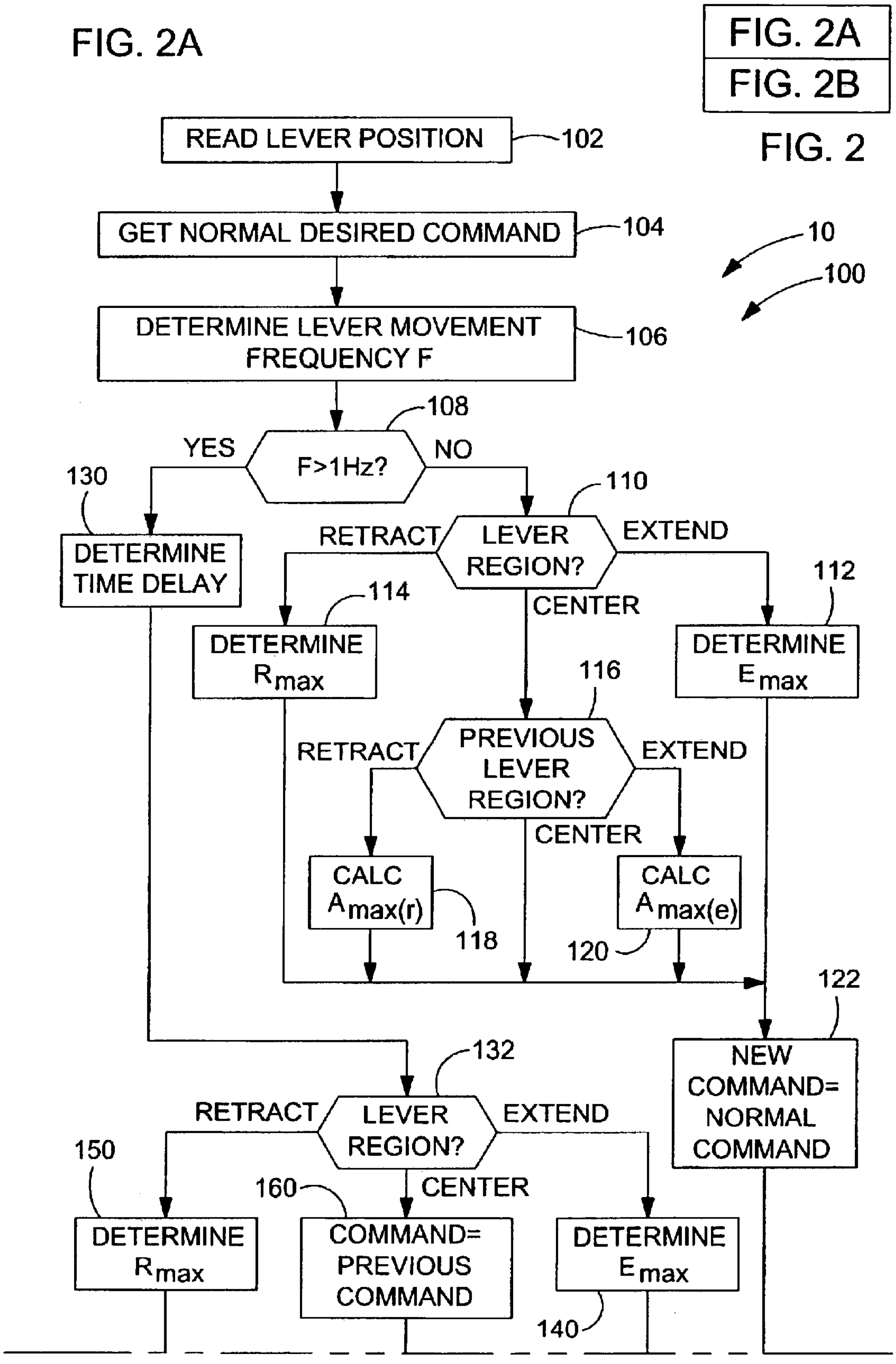
FIGS. 2A and 2B form a logic flow diagram illustrating an algorithm executed by the lever control unit of FIG. 1.
Figure 2B:
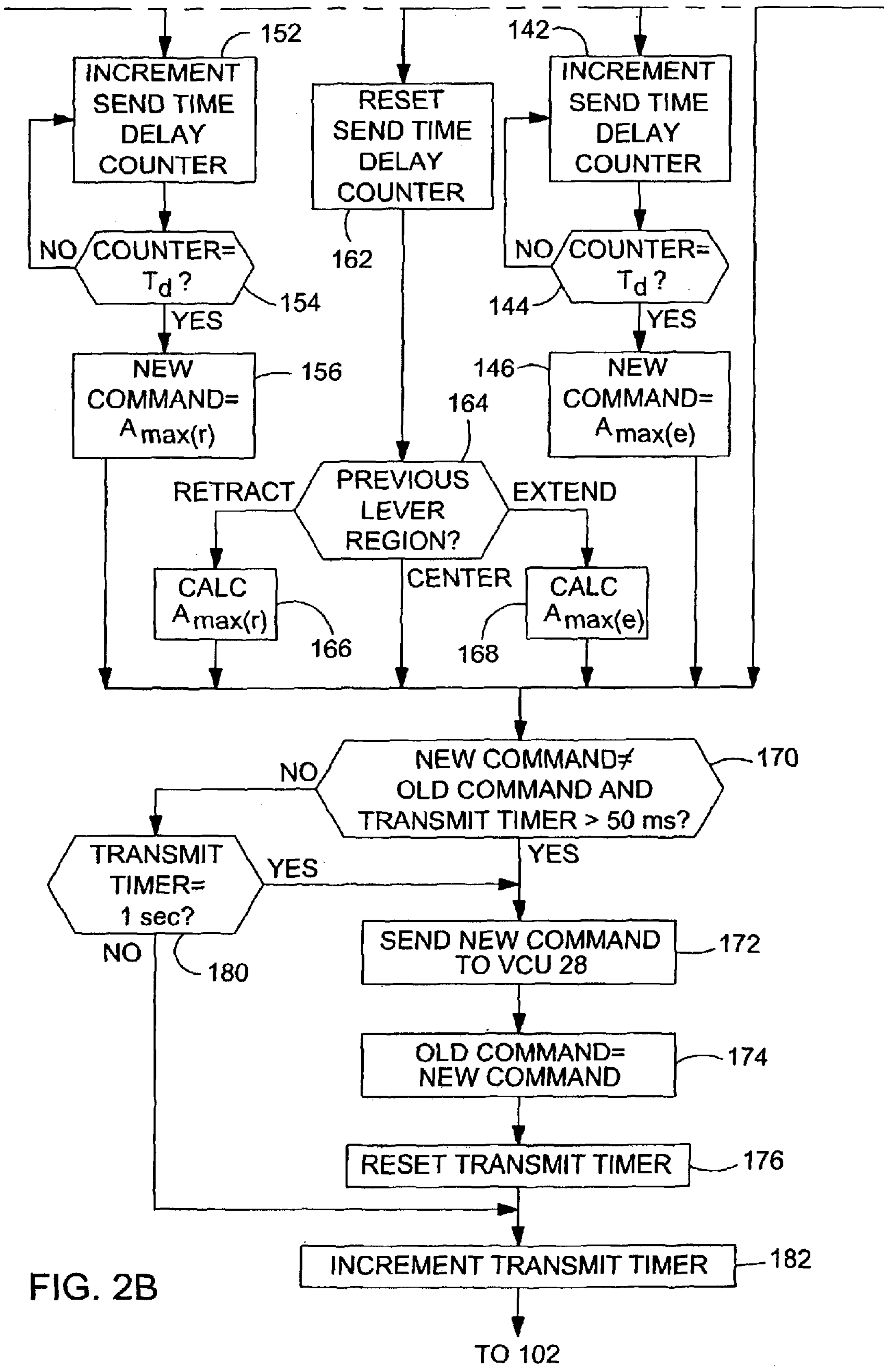

The lever unit 34 periodically, such as every 20 milliseconds, executes an algorithm 100 represented by FIGS. 2A and 2B. The conversion of this flow chart into a standard language for implementing the algorithm described by the flow chart in a digital computer or microprocessor, will be evident to one with ordinary skill in the art.

In step 102 unit 34 reads and stores the current lever position value generated by sensor 38. From a lookup table stored in a memory of unit 34, step 104 determines a Normal Desired Command value which is preferably proportional to the lever position value read in step 102.

Step 106 determines the movement oscillation frequency F at which the lever 36 moves back and forth between its retract and extend regions. This is accomplished by using two software timers (not shown), each associated with one of the extend and retract regions. When the lever 36 moves out of either the extend and retract regions, then a) the timer associated with that region is reset and b) the value of the other timer is read and stored. Each timer is periodically decremented when the lever is not in the region associated with that timer. Ultimately, if the lever 36 is repeatedly moved back and forth between regions, the unit 34 will determine and store the total cycle time of a round trip of the lever. The inverse of this cycle time is the lever frequency F.

Step 108 compares the lever frequency F to a threshold, such as 1 Hz. If lever frequency F is not greater than 1 Hz, step directs the algorithm to step 110.

Step 110 determines whether the lever 36 is in a center region, the retract region or the extend region. Step 110 directs the algorithm to step 112 if lever 36 is in the extend region, to step 114 if lever 36 is in the retract region and to step 116 if lever 36 is in the center region.

Step 112, from the stored lever positions from step 102, determines and stores the maximum lever position Emax in the extend region, which corresponds to the farthest the lever 36 has moved into the extend region.

Step 114, from the stored lever positions from step 102, determines and stores the maximum lever position Rmax in the retract region, which corresponds to the farthest the lever 36 has moved into the retract region.

Step 116 determines whether the lever 36 was previously in the retract, center or the extend region. Step 116 directs the algorithm to step 118 if lever 36 was previously in the retract region, to step 120 if lever 36 is previously in the extend region and to step 122 if lever 36 was previously in the center region.

Step 118 calculates an average maximum retract region command value, Amax(r) as an average of the current maximum retract region lever position value Rmax, multiplied by a scaling factor C, and a stored previous Amax(r) value as follows:

$$A\max(r)=[R\max+((C-1)\times A\max(r))]\div C,$$

where the scaling factor C is preferably set to a value of 4.

Step 120 calculates an average maximum extend region command value, Amax(e) as an average of the current maximum extend region lever position value Emax, multiplied by the scaling factor C, and the stored previous Amax(e) value as follows:

$$A\max(e)=[E\max+((C-1)\times A\max(e))]\div C.$$

Following steps 112, 114, 116 or 118, step 122 sets the NEW COMMAND value equal to the Normal Desired Command (from step 104) and directs the algorithm to step 170.

Thus, when lever 36 is being moved relatively slowly, steps 110–122 operate to generate a new command signal, NEW COMMAND, which is essentially proportional to the position of lever 36.

Returning to step 108, if lever frequency F is greater than 1 Hz, step 108 directs the algorithm to step 130.

Step 130 determines a time delay value Td as a function of the lever frequency F, as follows Td=(1/F)/K, where K is an empirically determined constant, such as 8. As a result, the more rapidly the lever 36 is moved back and forth, the shorter will be the time delay value. Td is preferably a fraction of the period of the back and forth movement of lever 36. It was found that when the lever 36 was moved at a high rate of speed a K value of 4 caused the command signal to be sent to VCU 28 well after the lever 36 had reached its maximum position. It was found that a K value of 8 worked well with both fast and slow rates of lever movement.

Step 132 determines whether the lever 36 is in a center region, the retract region or the extend region. Step 132 directs the algorithm to step 140 if lever 36 is in the extend region, to step 150 if lever 36 is in the retract region, and to step 160 if lever 36 is in the center region.

Step 140, from the stored lever positions from step 102, determines and stores the maximum lever position Emax in the extend region, which corresponds to the farthest the lever 36 has moved into the extend region.

Steps 142 and 144 operate to repeatedly increment the send delay counter until the counter value reaches a value representing the time delay Td calculated in step 130. When the time period Td has expired, then step 144 directs the alg to step 146, which sets the NEW COMMAND value equal to the previously determined average maximum command value for the extend region, Amax(e). From step 146 control passes back to step 170. As a result of steps 130 and 142–144, the timing of the sending of command signals will be a function of a frequency at which the lever is moved.

If step 132 determines that the lever 36 is in the retract region, control passes to step 150.

Step 150, from the stored lever positions from step 102, determines and stores the maximum lever position Rmax in the retract region, which corresponds to the farthest the lever 36 has moved into the retract region.

Steps 152 and 154 operate to repeatedly increment the send delay counter until the counter value reaches a value representing the time delay Td calculated in step 130. When the time period Td has expired, then step 154 directs the alg to step 156, which sets the NEW COMMAND value equal to the average maximum command value for the retract, Amax(r). From step 156 control passes back to step 170.

As a result of steps 146 and 156, the magnitude of the command signals will be a function of the magnitude of the displacements of the lever from its center position.

If step 132 determines whether the lever 36 is in a center region, control passes to step 160.

Step 160 sets the NEW COMMAND value equal the OLD COMMAND value from previous operation of step 174.

Step 162 resets the send time delay counter value to zero.

Step 164 determines whether the lever 36 was previously in the retract, center or the extend region. Step 164 directs the algorithm to step 166 if lever 36 was previously in the retract region, to step 168 if lever 36 is previously in the extend region and to step 170 if lever 36 was previously in the center region.

Step 166, as described with respect to step 118, re-calculates the average maximum retract region command value Amax(r).

Step 168, as described with respect to step 120, re-calculates the average maximum extend region command value Amax(e).

Following steps 122, 166 or 168, the algorithm proceeds to step 170.

Step 170 directs the algorithm to step 172 if the command value is changed (NEW COMMAND≠OLD COMMAND)

and if more than 50 milliseconds have elapsed since a command value was previously transmitted to the VCU 28, else to step 180. A software timer or counter "Transmit Timer" is utilized to determine the elapsed time since a command value was previously transmitted.

Step 180 directs the algorithm to step 172 if Transmit Timer indicates that a full second has elapsed since a command value was previously transmitted to the VCU 28, else to step 182.

Step 172 sends NEW COMMAND to the VCU 28, which in turn, causes the valve unit 22 to extend or retract the bucket cylinder 12.

Step 174 sets the OLD COMMAND equal to the NEW COMMAND.

Step 176 resets the Transmit Timer so the transmit timer can monitor the time expired since the operation of step 172.

After steps 180 or 176, step 182 increments the Transmit Timer and returns the algorithm to step 102.

As a result, when lever 36 is being moved relatively slowly, steps 110–122 and 170–172 operate to transmit to VCU 28 a new command signal which is essentially proportional to the position of lever 36.

However, if the operator rapidly moves the lever 36 back and forth, steps 130–172 operate to cause control unit 34 to send to VCU 28 command signals which are based on maximum extend and retract positions of the lever 36. This assures that the bucket 12 will be vigorously shaken despite slow signal transmission rates between the electronic lever unit 34 and the remote VCU 28. The command signals will be a function of both how fast the operator is moving the control lever and also of how far away from the center the lever moves. The frequency or timing of the command signals will be a function of the frequency at which the lever is moved, and the magnitude of the command signals will be a function of the magnitude the displacements of the lever from its center position.

The algorithm will attempt to transmit maximum command signals in phase with the actual lever position. For example, when the operator wishes to "shake" debris from a loader's bucket, the operator will rapidly actuate the control lever. Upon detection of rapid lever motion, the algorithm will begin transmitting a valve command based on an average peak lever position and only when the lever is near it's peak position.

Steps 170, 180 and 182 operate to prevent transmission of a new command to VCU 28 for 1 second if the command is unchanging.

Step 170 operates to transmit a new command to VCU 28 every 50 milliseconds if the command is changing.

While the present invention has been described in conjunction with a specific embodiment, it is understood that many alternatives, modifications and variations will be apparent to those skilled in the art in light of the foregoing description. Accordingly, this invention is intended to embrace all such alternatives, modifications and variations which fall within the spirit and scope of the appended claims.

We claim:

1. In a system having a hydraulic function which can be extended and retracted under the control of an electrohydraulic valve unit, an operator movable command lever movable into extend, center and retract regions, a sensor generating a lever position signal, an electronic lever command unit receiving the lever position signal and generating a valve command signal, an electronic valve control unit (VCU) remote from and communicated with the lever command unit, the VCU supplying hydraulic fluid to the hydraulic function in response to the valve command signal, a method of generating the valve command signal comprising:

determining a movement oscillation frequency of the lever; and if the oscillation frequency is greater than a threshold value, transmitting to the VCU a maximum extend command derived from maximum lever position values when the lever is in the extend region, and transmitting to the VCU a maximum retract command derived from maximum lever position values when the lever is in the retract region.

2. The method of claim 1, wherein:

if the oscillation frequency is not greater than a threshold value, transmitting to the VCU an extend command derived from a current lever position when the lever is in the extend region, and transmitting to the VCU a retract command derived from a current lever position when the lever is in the retract region.

3. The method of claim 2, wherein:

the extend command is proportional to the current lever position when the lever is in the extend region, and the retract command is proportional to the current lever position when the lever is in the retract region.

4. The method of claim 1, further comprising:

determining a send time delay value; and transmitting commands to the VCU upon expiration of the send time delay.

5. The method of claim 4, wherein:

the send time delay is a fraction of a period of the movement oscillation of the lever.

6. The method of claim 4, further comprising:

periodically incrementing a send time delay counter when the lever is in the extend or retract region; and resetting the send time delay counter when the lever is in the center region.

7. The method of claim 1, further comprising:

when the lever moves into the center region, calculating an average maximum retract lever position value if the lever was previously in the retract region, or calculating an average maximum extend lever position value if the lever was previously in the extend region.

8. The method of claim 1, further comprising:

transmitting a new command to the VCU if the new command differs from a previous command and if a certain time period has elapsed since the previous command was transmitted to the VCU.

9. The method of claim 1, further comprising:

preventing transmission of a command to the VCU if the command is changing and less than a certain time period has elapsed since a previous command was transmitted to the VCU.

10. The method of claim 7, wherein:

the average maximum retract lever position value Amax (r) is an average of a current maximum retract region lever position value Rmax, multiplied by the scaling factor C, and a stored previous Amax(r) value; and the average maximum extend lever position value Amax (e) is an average of the current maximum extend region lever position value Emax, multiplied by the scaling factor C, and the stored previous Amax(e) value.

11. In a system having a hydraulic function which can be extended and retracted under the control of an electrohydraulic valve unit, an operator movable command lever movable into extend, center and retract regions, a sensor generating a lever position signal, an electronic lever command unit receiving the lever position signal and generating a valve command signal, an electronic valve control unit (VCU) remote from and communicated with the lever command unit, the VCU supplying hydraulic fluid to the hydraulic function in response to the valve command signal, a method of generating the valve command signal comprising:

determining and storing lever extend position values and lever retract position values as the lever moves through the extend region;

determining from the stored lever extend position values a maximum lever extend value;

determining from the stored lever retract position values a maximum lever retract value;

determining a movement oscillation frequency of the lever; and if the oscillation frequency is greater than a threshold value, transmitting to the valve control unit a command signal derived from the maximum lever extend values when the lever is in the extend region and transmitting to the valve control unit a command signal derived from the maximum lever retract values when the lever is in the retract region.

12. The method of claim 11, wherein:

if the oscillation frequency is not greater than a threshold value, transmitting to the VCU an extend command derived from a current lever position when the lever is in the extend region, and transmitting to the VCU a retract command derived from a current lever position when the lever is in the retract region.

13. The method of claim 12, wherein:

the extend command is proportional to the current lever position when the lever is in the extend region, and the retract command is proportional to the current lever position when the lever is in the retract region.

14. The method of claim 11, further comprising:

determining a send time delay value; and transmitting commands to the VCU upon expiration of the send time delay.

15. The method of claim 14, wherein:

the send time delay is a fraction of a period of the movement oscillation of the lever.

16. The method of claim 14, further comprising:

periodically incrementing a send time delay counter when the lever is in the extend or retract region; and resetting the send time delay counter when the lever is in the center region.

17. The method of claim 11, further comprising:

when the lever moves into the center region, calculating an average maximum retract lever position value if the lever was previously in the retract region, or calculating an average maximum extend lever position value if the lever was previously in the extend region.

18. The method of claim 11, further comprising:

transmitting a new command to the VCU if the new command differs from a previous command and if a certain time period has elapsed since the previous command was transmitted to the VCU.

19. The method of claim 11, further comprising:

preventing transmission of a command to the VCU if the command is changing and less than a certain time period has elapsed since a previous command was transmitted to the VCU.

20. The method of claim 17, wherein:

the average maximum retract lever position value Amax (r) is an average of a current maximum retract region lever position value Rmax, multiplied by the scaling factor C, and a stored previous Amax(r) value; and the average maximum extend lever position value Amax (e) is an average of the current maximum extend region lever position value Emax, multiplied by the scaling factor C, and the stored previous Amax(e) value.

21. In a system having a hydraulic function which can be extended and retracted under the control of an electrohydraulic valve unit, an operator movable command lever movable into extend, center and retract regions, a sensor generating a lever position signal, an electronic lever command unit receiving the lever position signal and generating a valve command signal, an electronic valve control unit remote from and communicated with the lever command unit, the electronic valve control unit controlling communication of hydraulic fluid to the hydraulic function in response to the valve command signal, a method of generating the valve command signal comprising:

when lever is moved relatively slowly, generating a command signal which is proportional to the lever position signal; and when the lever is moved relatively rapidly, generating a command signal which is based on a maximum excursion of the lever into the extend and retract regions.

22. In a system having a hydraulic function which can be extended and retracted under the control of an electrohydraulic valve unit, an operator movable command lever movable into extend, center and retract regions, a sensor generating a lever position signal, an electronic lever command unit receiving the lever position signal and generating a valve command signal, an electronic valve control unit remote from and communicated with the lever command unit, the electronic valve control unit controlling communication of hydraulic fluid to the hydraulic function in response to the valve command signal, a method of generating the valve command signal comprising:

generating command signals with a timing which is a function of a frequency at which the lever is moved; and generating command signals having a magnitude which is a function of the magnitude of displacement of the lever from its center position.

* * * * *